United States Patent [19]
Takahashi

[11] Patent Number: 5,949,449
[45] Date of Patent: *Sep. 7, 1999

[54] PRINTING APPARATUS AND PRINTING METHOD

[75] Inventor: Tsutomu Takahashi, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/499,910

[22] Filed: Jul. 11, 1995

[30] Foreign Application Priority Data

| Jul. 15, 1994 | [JP] | Japan | 6-164330 |
| Jun. 13, 1995 | [JP] | Japan | 7-146247 |

[51] Int. Cl.⁶ .............. B41J 2/145; B41J 2/15; B41J 29/38
[52] U.S. Cl. .................. 347/40; 347/12; 347/14
[58] Field of Search ................ 347/40, 43, 37, 347/12, 14, 15

[56] References Cited

U.S. PATENT DOCUMENTS

| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,812,859 | 3/1989 | Chan et al. ............... 347/43 |
| 4,864,328 | 9/1989 | Fischbeck ............... 347/43 |
| 5,359,355 | 10/1994 | Nagoshi et al. ............ 347/40 |

FOREIGN PATENT DOCUMENTS

| 54-056847 | 5/1979 | Japan . |
| 59-123670 | 7/1984 | Japan . |
| 59-138461 | 8/1984 | Japan . |
| 60-071260 | 4/1985 | Japan . |

*Primary Examiner*—N. Le
*Assistant Examiner*—Thinh Nguyen
*Attorney, Agent, or Firm*—Fitzpatrick, Cella, Harper & Scinto

[57] ABSTRACT

A printing method is for printing per line by driving a printing head to travel in the main scanning direction. This printing head is provided with a plurality of printing elements arranged in the direction almost but not exactly perpendicular to the main scanning direction. In this method, when the printing head is driven to travel in a speed faster or slower than the standard speed for the usual printing operation, the number of printing elements of the printing head to be used for printing is reduced, hence making it possible to provide a printing apparatus and method capable of reducing the difference in printing quality to be caused by the application of plural printing speeds without changing the driving conditions of the printing head.

7 Claims, 4 Drawing Sheets

PRINTING APPARATUS AND PRINTING METHOD

BACKGROUND OF THE INVENTION

1. Field of the Invention

The present invention relates to a printing apparatus for recording dots per line on a recording medium, and a printing method therefor.

2. Related Background Art

A printing apparatus for recording dots per line, the so-called serial dot printer, has hitherto been used widely. The features of the serial dot printer are: compared to a line printer or a page printer, it can be fabricated more compactly at lower costs, and it can also be arranged to change printing speeds or to change printing resolutions by changing the space between prints. However, a printer of the kind is arranged to execute printing of each line by separate printing scans. Therefore, it is important to enhance the positional precision of prints between lines in order to improve the printing quality. Further, there is a need for providing a uniform printing quality even when the speed, resolution, or other printing conditions are changed.

However, in the case of a serial dot printer whose printing head is driven by the application of heat, for example, differences in heating condition of the printing elements and other related conditions greatly affect the printing quality if the conditions, such as intervals of driving time for the respective dots (printing elements) of the printing head, should change in accordance with the printing speeds (the traveling speeds of the printing head). Therefore, it is extremely difficult to obtain the optimal driving condition of the printing head for each of the plural kinds of printing speeds, and change driving conditions appropriately in accordance with the respective printing speeds.

SUMMARY OF THE INVENTION

The present invention is designed in consideration of the problems described above. It is an object of the invention to provide a printing apparatus capable of reducing the difference between each printing quality resulting from the application of plural printing speeds without changing driving conditions of the printing head, and to provide a printing method therefor.

In order to solve the problems described above and achieve the object of the invention, a printing apparatus is provided with a printing head having a plurality of printing elements arranged in the direction substantially perpendicular, that is, almost but not exactly perpendicular or substantially perpendicular to the main scanning direction, which is driven to travel in the main scanning direction to execute printing per line. In accordance with the present invention, this printing apparatus comprises:

traveling means to enable the printing head to travel in plural kinds of speeds in the main scanning direction;

instructing means to instruct the traveling speed of traveling means; and controlling means to change the number of printing elements to be used by the printing head in accordance with the traveling speed instructed by instructing means.

Also, in accordance with the present invention, the printing head of the printing apparatus is an ink jet recording head for recording by discharging ink.

Also, in accordance with the present invention, the printing head is the one to discharge ink by utilizing thermal energy, and is provided with thermal energy transducing elements to generate thermal energy to be given to ink.

Also, a printing method is to drive a printing head, which is provided with a plurality of printing elements arranged in the direction almost but not exactly perpendicular to the main scanning direction, to travel in the main scanning direction, and print per line. In accordance with the present invention, this method makes it possible to reduce the number of printing elements to be used for the printing head when the printing head is driven to travel in a speed faster or slower than the standard speed of the printing head to execute its usual printing.

Also, the printing method of the present invention is to cause the printing head to scan on the same line several times in order to compensate the reduced printing height because of the reduced number of printing elements for use as described above.

Also, in the printing method of the present invention, the printing head is an ink jet recording head for recording by discharging ink.

Also, in the printing method of the present invention, the printing head is the one to discharge ink by utilizing thermal energy, and is provided with thermal energy transducing elements to generate thermal energy to be given to ink.

Also, the printing apparatus of the present invention is to drive a printing head, which is provided with a plurality of printing elements arranged in the direction almost but not exactly perpendicular to the main scanning direction, to travel in the aforesaid main scanning direction to execute printing per line. This apparatus comprises:

traveling means to enable the printing head to travel in a plurality of different speeds in the aforesaid main scanning direction;

instructing means to instruct the traveling speed of traveling means; and controlling means to change the number of printing elements of the printing head to be used for printing by means of one main scan, and to print one line by plural times of the main scans in accordance with the traveling speeds instructed by instructing means.

Also, the printing method of the present invention is to drive a printing head, which is provided a plurality of printing elements arranged in the direction almost but not exactly perpendicular to the main scanning direction, to travel in the main scanning direction to execute printing per line. This printing method comprises the following steps of:

instructing the speeds of the printing head to travel in the main scanning direction;

reducing the number of the printing elements of the printing head to be used for printing by means of one main scan; and printing one line by plural times of main scans.

With the printing apparatus and method, which are arranged as described above in accordance with the present invention, the heat generating condition of the printing elements and other conditions are the same if only the driving conditions of the printing head are the same. Therefore, no change takes place in the printing qualities thus obtained. Attention is given to this fact. It is then arranged to change the number of printing elements to be used in order to prevent the printing quality from being degraded by change of traveling speeds of the printing head, while maintaining the same driving conditions of the printing elements. In other words, when the driving conditions of the printing head are made equal, the printed letters are inclined if the driving intervals are set as in the usual printing by use of the plural printing elements, and the traveling speed of the printing head is changed from the speed of the usual printing in such conditions, because the plural printing elements of the printing head are arranged in the direction almost but not exactly perpendicular to the main scanning direction, that is, these elements are arranged at a given angle in the direction perpendicular to the main scanning direction. In this case, however, if the number of printing elements to be used is reduced, the length of the inclined lines becomes shorter even at the same angle of inclination. Consequently, the inclination of lines becomes less conspicuous, thus making it possible to prevent the print quality from being degraded.

Also, when the number of printing elements to be used is reduced, the length of lines becomes shorter in the height direction of each letter, that is, it becomes shorter in the sub-scanning direction, but it is possible to obtain the required length by repeating the scanning of the printing head on the same line several times. Hence there is no problem in executing the printing operation in this way.

DETAILED DESCRIPTION OF THE PREFERRED EMBODIMENTS

Hereinafter, with reference to the accompanying drawings, the detailed description will be made of the preferable embodiments in accordance with the present invention.

Figure 1:
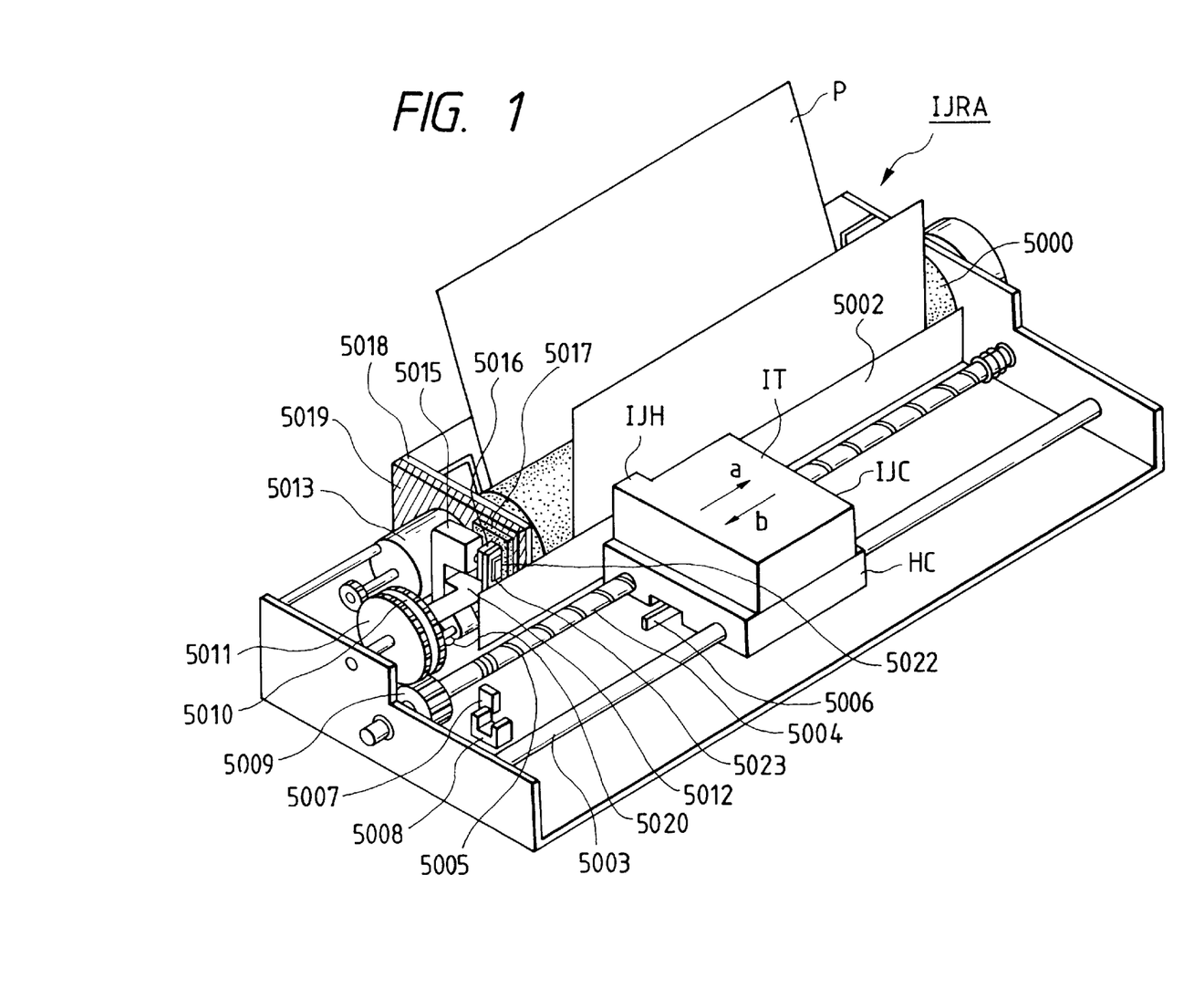
FIG. 1 is a view which shows the external appearance of an ink jet recording apparatus IJRA to which the present invention is applicable.

At first, FIG. 1 is a view which shows the external appearance of an ink jet recording apparatus IJRA to which the present invention is applicable. In FIG. 1, a lead screw 5004 rotates by means of the regular or reversal rotation of a driving motor 5013 through driving power transmission gears 5011 and 5009 interlocked therewith. A carriage HC is provided with a pin (not shown) that engages with the spiral groove 5005 of the lead screw thus arranged so that the carriage reciprocates in the directions indicated by arrows a and b. On this carriage HC, an ink jet cartridge IJC is mounted. Here, a reference numeral 5002 designates a sheet pressure board, which presses the recording sheet to a platen 5000 over the traveling direction of the carriage; 5007 and 5008, a photo-coupler whereby to confirm the presence of the lever 5006 of the carriage in the location where the photo-coupler is installed, serving as means for detecting its home position in order to switch the rotational directions of the motor 5013; 5016, a member to support a cap 5022 for capping the front surface of the recording head; 5015, suction means for sucking inside this cap to execute the sucking recovery of the recording head through an aperture 5023 in the cap; 5017, a cleaning blade; 5019, a member that enables the blade to move forward or backward, which is supported by the main body supporting board 5018: the blade is not necessarily confined to this mode, but any known cleaning blade is applicable to it as a matter of course; also, 5012, a lever to start sucking for a suction recovery, which moves along the movement of a cam 5020 engaging with the carriage: this movement is regulated by controlling the driving power from the driving motor by known means of transmission such as switching clutches.

It is arranged to process the capping, cleaning, and suction recovery as desired by the function of the lead screw 5004 in each of its corresponding positions when the carriage arrives in the area on the home position side, but if only the desired process is executable with known timing, the arrangement is not necessarily confined thereto in the present embodiment.

Figure 2:
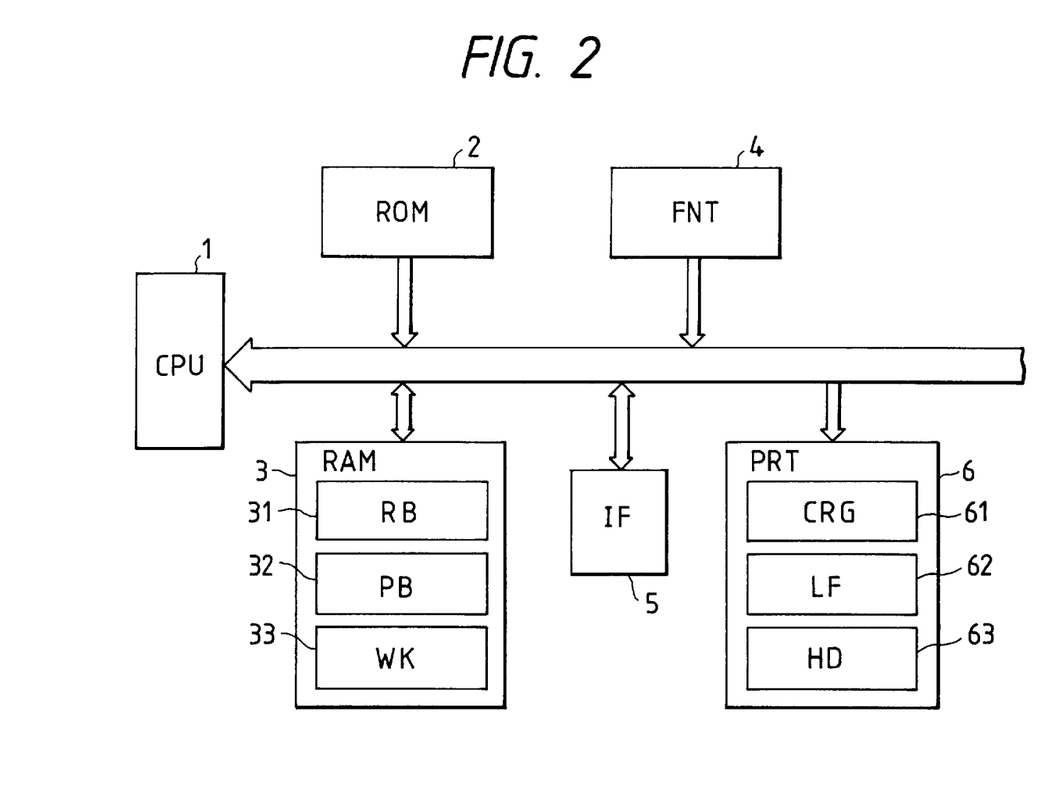
FIG. 2 is a block diagram which shows the structure of the control unit of the ink jet recording apparatus (IJRA).

FIG. 2 is a block diagram which shows the structure of the ink jet recording apparatus (IJRA) described above, that is, it shows the structure of the control unit of a serial printer.

In FIG. 2, a reference numeral 1 designates a CPU, which operates in accordance with programs stored in a ROM 2. In the ROM 2, there are stored, among others, a program to control the carriage HC and sheet feeding in accordance with printing speeds, and a program to print the printing data by transferring them to the recording head IJH serving as a printing head.

A reference numeral 3 designates a RAM comprising a reception buffer (RB) 31, a printing buffer (PB) 32 for storing dot data to be printed, and a work area (WK) 33 for storing printing speeds and any other information that may be required.

A reference numeral 4 designates a font ROM (FNT) for storing data on character fonts; 5, an interface unit (IF) to receive print commands and data from the external equipment. The print data thus received are read by the CPU 1, and stored provisionally in the reception buffer (RB) 31. After that, these are processed one after another by means of the control program stored in the ROM 2. If the print data to be processed are text data, character font data are read from the font ROM 4 and stored in the print buffer (PB) 32. Any image data are stored in the print buffer (PB) 32 as they are immediately received. Also, for any print commands regulating the printing speeds, its information is stored in the work (WK) 33.

A reference numeral 6 designates a printing unit (IJRA): in the present embodiment, an ink jet recording printer provided with a recording head having 128 nozzles arranged in the perpendicular direction is adopted as an example; 61, a carriage driving unit (RGB) to drive the carriage HC in the transverse direction with the printing head being mounted on the carriage; also, 62, a line feed driving unit (LF) to feed the printing sheet P in the vertical direction; and 63, a head driving unit (HD) to print the printing data stored in the printing buffer 32 by discharging ink from each of the nozzles of the recording head IJH.

Figure 3:
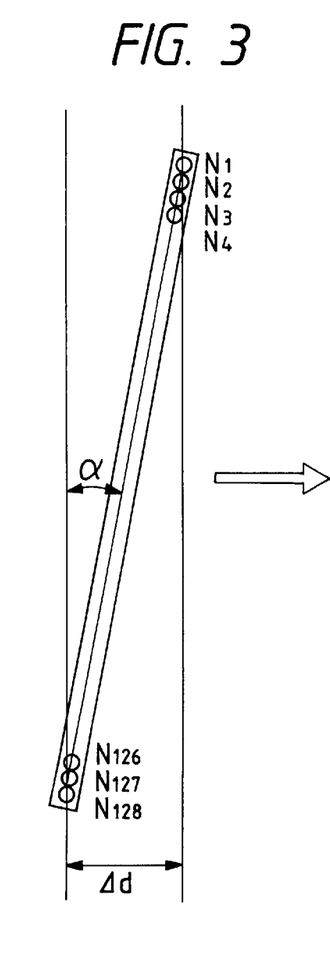
FIG. 3 is a view which illustrates the structure of the recording head IJH in accordance with the present embodiment.

FIG. 3 is a view which illustrates the structure of a recording head IJH in accordance with the present embodiment.

The recording head IJH is provided with 128 nozzles ($N_1$, $N_2$, ..., $N_{128}$). Each nozzle is driven from the nozzle $N_1$ to $N_{128}$ to discharge ink at an equal time interval per nozzle. Each of the 128 nozzles is arranged in the perpendicular direction at a pitch of 1/360 inch between them, respectively. The reason that nozzles are driven one by one is to minimize influences to be exerted between nozzles. Also, the recording head IJH is structured so that it is inclined at an angle α (3.58 degrees in the present embodiment) to the main scanning direction. This angle is determined by the printing speed in the main scanning direction and delay time provided for driving each nozzle. In other words, in order to perpendicularly align the discharging position of each nozzle on a straight line on a recording sheet, it is arranged to drive the nozzles $N_1$ to $N_{128}$ at an equal time interval so that the recording head IJH is caused to travel in the same speed by an amount of Δd (1/360 inch in the present embodiment) in the direction indicated by an arrow by the application of the standard printing speed (a speed to materialize 360 dpi in the present embodiment).

Figure 4A:
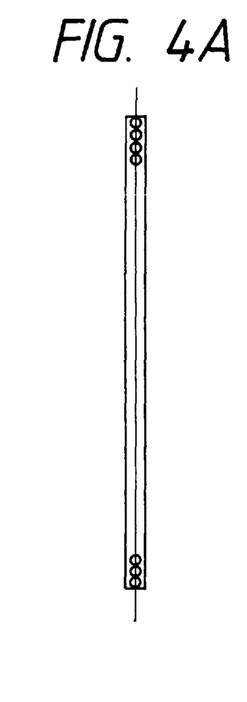
FIGS. 4A, 4B and 4C are views which illustrate the positions of dots printed in accordance with the present embodiment.
Figure 4B:
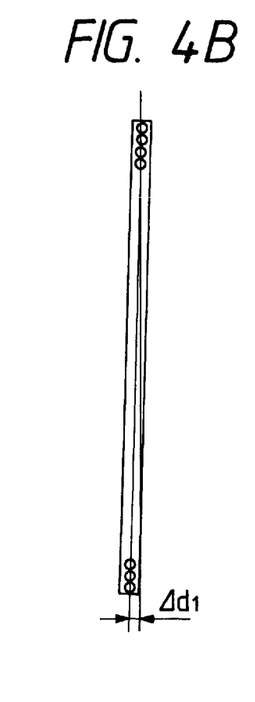
Figure 4C:
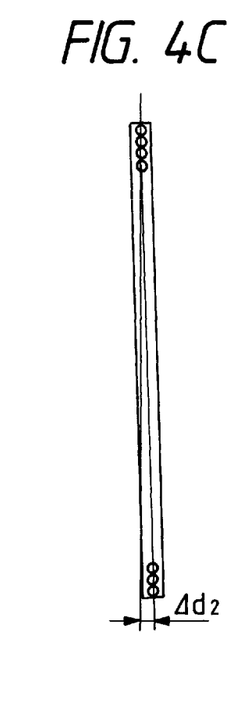

FIGS. 4A to 4C are views which illustrate the position of dots to be printed in the present embodiment.

FIG. 4A shows the discharging position of each nozzle when the carriage HC shifts in an amount of Δd during the period of driving nozzles $N_1$ to $N_{128}$ of the recording head IJH represented in FIG. 3. In other words, the discharging position of each nozzle is aligned perpendicularly on a straight line. FIG. 4B shows the discharging position of each nozzle when the speed of the carriage to travel is slower than that of the example shown in FIG. 4A (a printing speed to materialize 400 dpi, for example). It shows that the prints are inclined to the right side. FIG. 4C shows the discharging position of each nozzle when the speed of the carriage to travel is faster than that of the example shown in FIG. 4A (a printing speed to materialize 300 dpi, for example). It shows that the prints are inclined to the left side.

It is understandable that in order to align the discharging position of each nozzle perpendicularly on a straight line, the time interval for discharge driving in the case shown in FIG. 4B should be made slower than that represented in FIG. 4A, while in the case of FIG. 4C, it should be made faster than that represented in FIG. 4A. However, if the time interval of discharge driving of nozzles should change, the heat generation and other influences also change between nozzles accordingly, thus producing adverse effect on the print quality in some cases.

Figure 5A:
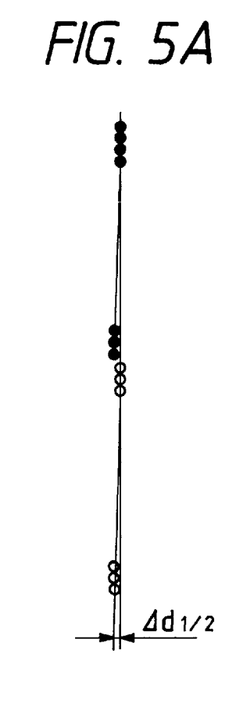
FIGS. 5A and 5B are views which illustrate the states of dots printed by use of half a number of nozzles of a recording head, while the printing speed of the carriage is made faster or slower than the standard speed, respectively.
Figure 5B:
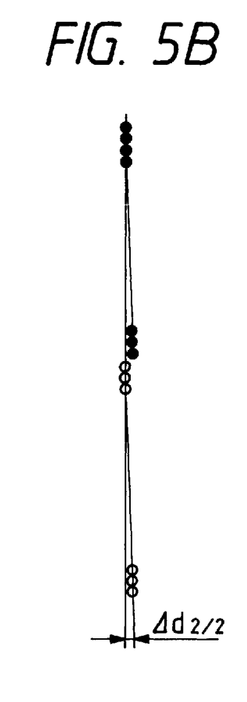

Therefore, in accordance with the present embodiment, it is arranged to reduce the number of nozzles to be used, not to use the total number of 128 nozzles of the recording head IJH as shown in FIGS. 5A and 5B when the carriage HC should travel faster or slower than the standard printing speed.

In other words, as shown in FIG. 5A, if the carriage HC should travel at a speed slower than the standard printing speed, (more specifically, it travels at a printing speed to materialize 400 dpi), 64 nozzles, a half of the total number, of the recording head IJH are used.

In this case, the height of lines to be printed is a half the height of the standard print because only a half the total nozzles of the recording head are in use. As a result, for printing every one line, the carriage scans twice on the same line, that is, for the first scan, upper 64 nozzles ($N_1$ to $N_{64}$) of the recording head IJH are used, and for the second scan, lower 64 nozzles ($N_{65}$ to $N_{128}$) are used. The dots indicated by black circles in FIG. 5A are those printed at the first scan while those indicated by white circles are the dots printed at the second scan. In this way, as shown in FIG. 5A, the maximum displacement of dots becomes a half of Δd2, that is, a half the displacement Δd1 shown in FIG. 4B. Therefore, the inclination of the perpendicular lines of letters printed become less conspicuous, thus making it possible to suppress the degradation of print quality. The number of nozzles to be used is not necessarily limited to a half the total nozzles described above as a matter of course. It may be possible to use 1/3 of the total number of the nozzles or still smaller number thereof, instead. In such a case, the scanning number per line should be three times or more, but the amount of displacement of dots become lesser to that extent. As a result, the print quality is further enhanced.

As described above, by using a part of the nozzles of the recording head IJH, while conducting the plural scans of the carriage to print one line, it is possible to minimize the degradation of print quality resulting from the changed states of heat generation of the recording head or the displacement of dots.

Also, FIG. 5B shows an example in which 64 nozzles, a half of the total number of nozzles of the recording head IJH are used when the carriage HC should travel at a faster speed than the standard printing speed, (more specifically, it travels at a printing speed to materialize 300 dpi). In this case, too, as shown in FIG. 5A, the displacement of dots to be printed is made to be a half the displacement of Δd2 shown in FIG. 4C, that is, a half the displacement amount Δd2.

In this respect, although not shown, it is easy to reduce the number of nozzles to be used by the recording head IJH. For example, the nozzles to be used are driven by the data on dots to be printed, which are read out from the printing buffer 32 for the number of such nozzles to be used, while giving NULL data to the nozzles that are not used this time. Also, it is readily understandable that the line feed after printing is performed per amount corresponding to the number of nozzles to be used so that the printing data are printed in succession.

Here, in the embodiment described above, the description has been made of a case where the nozzles ($N_1$, $N_2$, ..., $N_{128}$) of the recording head are driven for discharging at an equal time interval per nozzle from $N_1$ to $N_{128}$ in that order, but the present invention is not necessarily limited thereto. As another embodiment, the 128 nozzles are divided into eight blocks of 16 nozzles each, for example, and then, it may be possible to drive a total of eight nozzles to discharge ink at a time per 16 nozzles. In this case, each nozzle in one block is driven at an equal time interval.

Figure 6A:
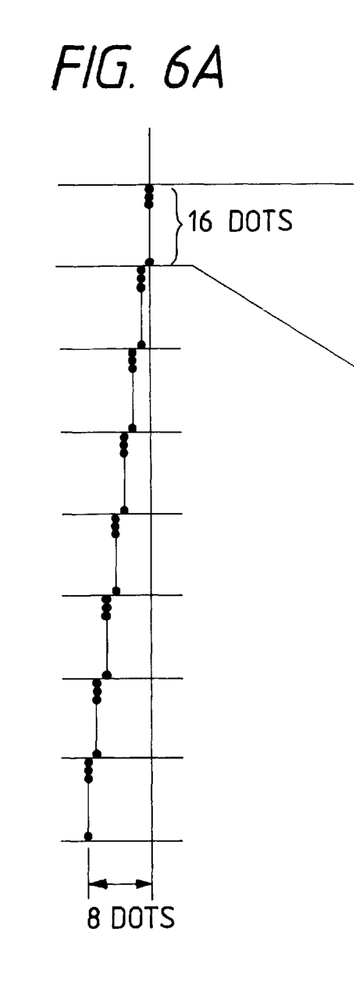
FIGS. 6A to 6C are views which show the state of dots printed by means of another embodiment in accordance with the present invention.

FIG. 6A is a view showing an example in which the recording head is driven in such a manner as described above at the standard printing speed (in the main scanning direction). Due to the relationship between the inclination α of the recording head and the size of nozzles, the position of the nozzle of the first dot in the main scanning direction in each block of 16 dots is displaced by a portion of one dot. Also, the standard printing speed means a speed whereby to align the recording positions of dots on a straight line when the first to sixteenth dots are driven one after another in each block in accordance with the inclination of the recording head. From these facts, the print data to be processed in each block are assumed to be displaced by one dot portion in the main scanning direction by the cycle of driving the first to the sixteenth dots one after another in each block. In this way, eight straight lines each formed by sixteen dots are recorded in the main scanning direction at positions displaced by the one dot portion each.

In this method for driving the recording head, when the carriage traveling speed is made faster or slower than the standard printing speed, eight nozzles, upper half of sixteen nozzles are driven for the first main scan in each block, and then, for the second main scan, another eight nozzles, lower half of the sixteen nozzles are driven in each block, hence making it possible to suppress the degradation of print quality. Now, regarding this example, the detailed description will be made with reference to FIGS. 6B and 6C.

Figure 6B:
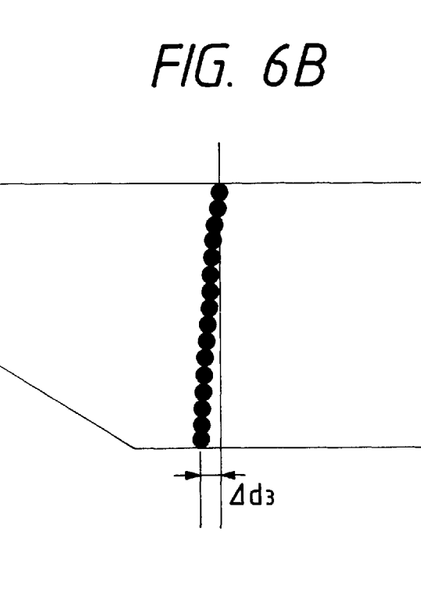

FIG. 6B is an enlarged view which shows the result of recording by the recording head in the first block when the carriage HC travels at a speed faster than the standard printing speed, (more specifically, at a speed to materialize 400 dpi). As shown in FIG. 6B, the result of 16-dot perpendicular recording by use of the nozzles in the block does not present any straight line perpendicularly, but a slanted line, which is displaced by a portion of Δd3 from the upper right to the lower left. As a result, the quality of print made by the recording head is degraded as a whole.

Figure 6C:
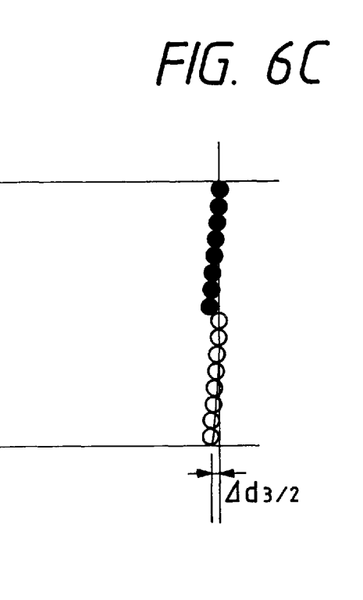

In contrast, in a case where the present invention is applied, the nozzles used for the first main scan are those positioned in the upper half portion (a portion corresponding to 8 nozzles) in each block, which is divided into eight blocks of sixteen nozzles each. At first, ink are discharged at a time from a total of eight nozzles positioned at the uppermost part of each block, and then, ink are discharged at a time from a total of eight nozzles positioned at the second row from the top in each block. The ink discharges are repeated one after another so that, for the first main scan, ink are discharged from 64 nozzles, eight nozzles×eight blocks. In FIG. 6C, the dots indicated by black circles are those formed by the first main scan.

Next, the nozzles used for the second main scan are those positioned in the lower half (a portion of eight nozzles) in each block, which is divided into eight blocks of sixteen nozzles each. At first, ink are discharged from a total of eight nozzles at a time, which are positioned in the ninth row from the top in each block, and then, ink are discharged from a total of eight nozzles positioned in the tenth row from the top in each block. The ink discharges are repeated one after another so that ink are discharged from 64 nozzles, eight nozzles×eight blocks, for the second main scan. In FIG. 6C, the dots indicated by white circles are those formed in the second main scan.

FIG. 6C is also an enlarged view showing the result of recording by the recording head in the first block. In accordance with the present embodiment, the amount of displacement is a half of Δd3 between the recording position of the recorded dots in the main scanning direction by use of the first nozzle in each block formed by the first main scan, and the dots recorded by the eighth nozzle. The amount of displacement is also the same between the recorded dots by the ninth nozzle in the second main scan, and the recorded dots by the sixteenth nozzle. Also, the position of recorded dots by the first nozzle in the first main scan, and the position of recorded dots by the ninth nozzle in the second main scan in the main scanning direction are positioned on the same straight line perpendicular to the main scanning direction. As a result, the inclination of perpendicular lines becomes less conspicuous in each block, hence making it possible to suppress the degradation of printing quality.

Also, when the carriage HC travels at a speed faster than the standard printing speed (more specifically, at a printing speed to materialize 300 dpi), the direction of displacement between recorded dots by nozzles of the recording head in each block is reversed. This is only what differs from the case where the carriage travels at a speed slower than the standard printing speed. Therefore, the same effects are obtainable by the application of the present embodiment.

As described above, even when change of printing resolutions is intended by means of plural printing speeds, it is possible to easily obtain a substantially uniform print quality by changing the number of dots to be recorded by the printing head without changing its driving conditions in accordance with the present embodiment.

For the present invention, the description has been made particularly of a printing apparatus using a method in which changes of state of ink are created when applying thermal energy by means (electrothermal transducing elements, laser beam, or the like, for example) for generating thermal energy to be utilized to discharge ink. With a method of the kind, it is possible to achieve recording in high density and high precision.

Regarding the typical structure and operational principle of such method, it is preferable to adopt those which can be implemented using the fundamental principle disclosed in the specifications of U.S. Pat. Nos. 4,723,129 and 4,740,796. This method is applicable to the so-called on-demand type recording system and a continuous type recording system as well. Particularly, however, the method is suitable for the on-demand type because the principle is such that at least one driving signal, which provides a rapid temperature rise beyond a departure from nucleation boiling point in response to recording information, is applicable to an electrothermal transducer disposed on a liquid (ink) retaining sheet or liquid passage whereby to cause the electrothermal transducer to generate thermal energy to produce film boiling on the thermoactive portion of recording means (recording head), thus effectively leading to the resultant formation of a bubble in the recording liquid (ink) one to one for each of the driving signals. By the development and contraction of the bubble, the liquid (ink) is discharged through a discharging port to produce at least one droplet. The driving signal is more preferably in the form of pulses because the development and contraction of the bubble can be effectuated instantaneously, and, therefore, the liquid (ink) is discharged with quick response.

The driving signal in the form of pulses is preferably such as disclosed in the specifications of U.S. Pat. Nos. 4,463,359 and 4,345,262. In this respect, the temperature increasing rate of the heating surface is preferably such as disclosed in the specification of U.S. Pat. No. 4,313,124 for an excellent recording in a better condition.

The structure of the recording head may be as shown in each of the above-mentioned specifications wherein the structure is arranged to combine the discharging ports, liquid passages, and the electrothermal transducers (linear type liquid passages or right-angled liquid passages). Besides, the structure such as disclosed in the specifications of U.S. Pat. Nos. 4,558,333 and 4,459,600 wherein the thermal activation portions are arranged in a curved area is also included in the present invention. In addition, the present invention is effectively applicable to the structure disclosed in Japanese Patent Laid-Open Application No. 59-123670 wherein a common slit is used as the discharging ports for plural electrothermal transducers, and to the structure disclosed in Japanese Patent Laid-Open Application No. 59-138461 wherein an aperture for absorbing pressure waves of the thermal energy is formed corresponding to the discharge ports.

Further, the present invention is effectively applicable to a recording head of full-line type having a length corresponding to the maximum width of a recording medium recordable by the recording apparatus. For such recording head, it may be possible to adopt either a structure whereby to satisfy the required length by combining a plurality of recording heads or a structure arranged by one recording head integrally formed.

In addition, the present invention is effectively applicable to the recording head of an exchangeable chip type, which can be electrically connected with the apparatus main body or to which ink can be supplied from the apparatus main body when it is installed in the apparatus main body, or to the recording head of a cartridge type in which an ink tank is formed integrally with the recording head itself.

Also, for the present invention, it is preferable to additionally provide a recording head with recovery means and preliminarily auxiliary means as constituents of the recording apparatus because these additional means will contribute to making the effectiveness of the present invention more stabilized. To name them specifically, these are capping means for the recording head, cleaning means, suction recovery means as described above, and in addition, recovery means by use of compression, preheating means such as electrothermal transducers or heating elements other than such transducers or the combination of those types of elements. The adoption of a predischarge mode, which performs discharging other than the regular discharge, is also contributable to executing a stabilized recording.

Also, the present invention is applicable not only to a recording mode in which only main color such as black is used, but also to an apparatus having at least one of multiple color modes with ink of different colors, or a full-color mode using the mixture of the colors, irrespective of whether the recording heads are integrally structured or structured by a combination of plural recording heads.

In the embodiments of the present invention described above, while the ink has been described as liquid, it may be an ink material which is solidified below the room temperature but liquefied at the room temperature. Since the ink is controlled within the temperature not lower than 30° C. and not higher than 70° C. to stabilize its viscosity for the provision of the stable discharge in general for an ink jet method, the ink may be such as to be liquefied when the applicable recording signals are given.

In addition, it may be possible to adopt the use of ink having a nature of being liquefied only by the application of heat so as to positively prevent the temperature from rising due to the thermal energy by use of such energy as an energy to be consumed for changing states of ink from solid to liquid, or to prevent ink from being evaporated by use of the ink which will be solidified when left intact. In any case, it may be possible to apply to the present invention such ink having a nature to be liquified only by the application of thermal energy, such as the ink, which is capable of being discharged as ink liquid by enabling itself to be liquefied when the thermal energy is applied in accordance with recording signals, and the ink, which will have already begun solidifying itself by the time it reaches a recording medium. In this case, it may be possible to retain ink in the form of liquid or solid in the recesses or through holes of a porous sheet such as disclosed in Japanese Patent Laid-Open Application No. 54-56847 or No. 60-71260 in order to enable ink to face the electrothermal transducers. In the present invention, the most effective method for the various kinds of ink mentioned above is the one, which is capable of implementing film boiling as described above.

Further, as the mode of the recording apparatus in accordance with the present invention, it may be possible to adopt a copying apparatus combined with a reader in addition to the image output terminal for a computer, or other information processing apparatus, and also, it may be possible to adopt a mode of a facsimile apparatus having transmitting and receiving functions.

As described above, for the printing apparatus and printing method of the present invention, attention is given to the fact that if the driving conditions of the printing head are the same, the heat generating condition and others of the printing elements are also the same, and no change occurs in printing quality. Thus, with the arrangement of the same conditions to drive the printing elements, while changing the number of printing elements to be used, it is intended to prevent the resultant degradation of print quality due to changes of traveling speed of the printing head. In other words, when the driving conditions are arranged to be the same for the printing head, that is, when the driving time interval between plural printing elements are made equal to that of the usual printing, the printed letters are inclined if the traveling speed of the printing head is changed from that of the usual printing. In this case, however, if the number of printing elements to be used is reduced, the inclination of lines becomes less conspicuous because the length of inclined line is made shorter even at the same angle of inclination, hence making it possible to prevent the printing quality from being degraded.

What is claimed is:

1. A printing apparatus for printing per swath by driving a printing head, provided with an array of a plurality of printing elements arranged in a slant direction with respect to a main scanning direction, to travel in the main scanning direction, comprising:

traveling means for enabling said printing head to travel at plural speeds in the main scanning direction, including a predetermined standard speed for a normal printing operation, in which printed dots are printed at a predetermined resolution;

determining means for determining the traveling speed of said traveling means; and controlling means for controlling printing of a swath by plural scans of said printing head in the main scanning direction by reducing a number of the printing elements used in a print by said printing head per main scan when said printing head is moved in the main scanning direction at a speed higher or lower than the standard speed for the normal printing operation, wherein the slant direction of the array of said plurality of printing elements of said printing head with respect to the main scanning direction and a driving time interval between said printing elements are set so that positions of a plurality of the printed dots are in a line in a direction perpendicular to the main scanning direction when said printing head is moved for printing at the predetermined standard speed corresponding to the normal printing operation, and wherein a driving time interval between said printing elements when said printing head moves at a speed higher or lower than the standard speed is equal to the driving time interval in the normal printing operation.

2. A printing apparatus according to claim 1, wherein at a time of said printing head traveling at the standard speed corresponding to the normal printing operation, all of said plural printing elements are used for printing, but when said printing head is driven to travel in a speed faster or slower than the standard speed, the number of said printing elements is reduced for use per scan.

3. A printing apparatus according to claim 1, wherein said printing head comprises an ink jet printing head for printing by discharging ink.

4. A printing apparatus according to claim 1, wherein said printing head comprises a printing head for discharging ink by utilizing thermal energy, and said printing elements comprise thermal energy transducing elements for generating the thermal energy to be applied to the ink.

5. A printing method for printing per swath by driving a printing head, provided with an array of a plurality of printing elements arranged in a slant direction with respect to a main scanning direction, to travel in the main scanning direction, comprising the steps of:

determining a traveling speed of said printing head in the main scanning direction;

reducing a number of the printing elements of said printing head for use in a print by said printing head per main scan when said printing head is moved in the main scanning direction at a speed higher or lower than a predetermined standard speed for a normal printing operation, in which printed dots are printed at a predetermined resolution; and printing one swath by plural times of main scans, wherein the slant direction of the array of said plurality of printing elements of said printing head with respect to the main scanning direction and a driving time interval between said printing elements are set so that positions of a plurality of the printed dots are in a line in a direction perpendicular to the main scanning direction when said printing head is moved for printing at the predetermined standard speed corresponding to the normal printing operation, and wherein a driving time interval between said printing elements when said printing head moves at a speed higher or lower than the standard speed is equal to the driving time interval in the normal printing operation.

6. A printing method according to claim 5, wherein said printing head comprises an ink jet printing head for printing by discharging ink.

7. A printing method according to claim 5, wherein said printing head comprises a printing head for discharging ink by utilizing thermal energy, and said printing elements comprise thermal energy transducing elements for generating the thermal energy to be applied to the ink.

* * * * *